US012199385B2

(12) United States Patent
Ruffini et al.

(10) Patent No.: US 12,199,385 B2
(45) Date of Patent: Jan. 14, 2025

(54) HIGH SPEED CABLE BRAID TERMINATION USING A COIL SPRING

(71) Applicant: TE Connectivity Solutions GmbH, Schaffhausen (CH)

(72) Inventors: Nicholas Paul Ruffini, Lancaster, PA (US); Matthew Richard Mcalonis, Elizabethtown, PA (US); Lynn Robert Sipe, Mifflintown, PA (US)

(73) Assignee: TE Connectivity Solutions GmbH (CH)

( * ) Notice: Subject to any disclaimer, the term of this patent is extended or adjusted under 35 U.S.C. 154(b) by 336 days.

(21) Appl. No.: 17/732,605

(22) Filed: Apr. 29, 2022

(65) Prior Publication Data

US 2023/0352884 A1 Nov. 2, 2023

(51) Int. Cl.

| | |
|---|---|
| ***H01R 13/6593*** | (2011.01) |
| ***H01R 4/48*** | (2006.01) |
| ***H01R 13/6585*** | (2011.01) |
| *H01R 13/6598* | (2011.01) |

(52) U.S. Cl.

CPC .......... *H01R 13/6593* (2013.01); *H01R 4/48* (2013.01); *H01R 13/6585* (2013.01); *H01R 13/6598* (2013.01)

(58) Field of Classification Search

CPC .. H01R 13/6593; H01R 4/48; H01R 13/6585; H01R 13/6598; H01R 9/0527; H01R 13/65914; H01R 13/6592; H01R 24/86

See application file for complete search history.

(56) References Cited

U.S. PATENT DOCUMENTS

| | | | | |
|---|---|---|---|---|
| 4,902,248 | A * | 2/1990 | Robertson | H01R 13/58 439/840 |
| 8,535,085 | B1 * | 9/2013 | Reilly | H01R 13/6592 439/462 |
| 9,257,796 | B1 | 2/2016 | Dang | |
| 10,224,668 | B2 * | 3/2019 | Benton | H01R 13/5205 |
| 11,434,734 | B1 * | 9/2022 | Stenmark | E21B 43/127 |

(Continued)

FOREIGN PATENT DOCUMENTS

| | | |
|---|---|---|
| DE | 202015103479 U1 | 8/2015 |
| DE | 202015100245 U1 | 2/2016 |
| DE | 102019106980 B3 | 2/2020 |

OTHER PUBLICATIONS

European Search Report 23170511 Mailed Date Sep. 5, 2023, European App. No. 23170511.2.

*Primary Examiner* — Travis S Chambers

(57) ABSTRACT

An assembly for terminating a high speed cable with an EMI braided shield, The assembly a shell housing, a crosstalk shield and a constant force spring. The shell housing has a mating end and a conductor receiving end. A recessed portion is provided proximate the conductor receiving end, the recessed portion has an outer diameter. The crosstalk shield is provided in the shell housing. The constant force spring is positioned in the recessed portion of the shell housing. The constant force spring has an opening with an inner diameter which is less than the outer diameter of the recessed portion. The constant force spring is circumferentially wrapped about the EMI braided shield to mechanically and electrically secure the EMI braided shield to the recessed portion of the shell housing.

17 Claims, 3 Drawing Sheets

(56) References Cited

U.S. PATENT DOCUMENTS

| | | | | |
|---|---|---|---|---|
| 11,721,941 | B2 * | 8/2023 | Thomasse | H01R 13/6592<br>439/607.53 |
| 2012/0034809 | A1 | 2/2012 | Reimchen | |
| 2015/0207258 | A1 * | 7/2015 | Moriuchi | H01R 13/5205<br>439/586 |
| 2015/0270647 | A1 | 9/2015 | Hoher et al. | |
| 2017/0365937 | A1 | 12/2017 | Juillet et al. | |
| 2020/0412064 | A1 | 12/2020 | Nguyen | |
| 2022/0094108 | A1 * | 3/2022 | Watanabe | H01R 4/28 |
| 2023/0352868 | A1 | 11/2023 | Ruffini et al. | |
| 2023/0352882 | A1 | 11/2023 | Ruffini et al. | |
| 2023/0352883 | A1 | 11/2023 | Ruffini et al. | |

* cited by examiner

HIGH SPEED CABLE BRAID TERMINATION USING A COIL SPRING

FIELD OF THE INVENTION

The present invention relates to a high speed electrical braid termination using a coil spring to terminate the cable's Electromagnetic Interference (EMI) braided shield to the shell housing of the connector assembly.

BACKGROUND OF THE INVENTION

Generally, with high speed, small cables, a ferrule is used to terminate or trap the EMI braided shield between the ferrule and the shell housing of the connector assembly. A hex crimp tool is then used to compress the ferrule, the EMI braided shield and the shell housing together, creating a tight electrical and mechanical interface therebetween.

Using ferrules to terminate the EMI braided shield requires expensive additional tooling and dies to be designed and used in the field. Reparability of such termination of the EMI braided shield to the shell housing is not possible because once the ferrule is crimped to the braided shield and shell housing, it cannot be un-crimped, trapping the insulator and contacts of the connector assembly inside the permanently deformed shell housing. The entire high speed connector assembly must be cut off and re-terminated with all new components. In addition, the crimped ferrule often does not provide the necessary tensile retention force to hold the insulator and contacts in the shell.

It is therefore desirable to provide an EMI braided shield termination which provides a repairable method to create the common electrical connection between the cable EMI braided shield and the shell housing of the connector assembly. In particular, it is desirable to provide a termination which uses a coil spring to provide the required tensile retention forces.

SUMMARY OF THE INVENTION

An object of the invention is to provide a device and method which creates a repairable and effective electrical and mechanical connection between an EMI braided shield of a small gauge, high speed cable to a shell housing of a connector assembly.

An object of the invention is to terminate the EMI braided shield of a small gauge, high speed cable to a shell housing of a connector assembly using a removable coil spring. The coil spring can be removed, the EMI braided shield rolled back, and the insulators pushed out of the shell housing to access the contacts for rework.

An object of the invention is to provide a termination device which can provide tensile retention forces well above a crimped ferrule's performance to prevent an ineffective mechanical and electrical connection.

an object of the invention is to provide a coil spring which requires no additional tooling to install or uninstall the coil spring from the EMI braided shield and the shell housing of the connector assembly.

An embodiment is directed to an assembly for terminating a high speed cable with an EMI braided shield, The assembly a shell housing, a crosstalk shield and a constant force spring. The shell housing has a mating end and a conductor receiving end. A recessed portion is provided proximate the conductor receiving end, the recessed portion has an outer diameter. The crosstalk shield is provided in the shell housing. The constant force spring is positioned in the recessed portion of the shell housing. The constant force spring has an opening with an inner diameter which is less than the outer diameter of the recessed portion. The constant force spring is circumferentially wrapped about the EMI braided shield to mechanically and electrically secure the EMI braided shield to the recessed portion of the shell housing.

An embodiment is directed to a cable assembly. The cable assembly has a shell housing with a mating end and a conductor receiving end. A recessed portion is provided in the shell housing proximate the conductor receiving end. The recessed portion has an outer diameter. The cable assembly includes a high speed cable with an EMI braided shield and differential pairs of signal conductors. The EMI braided shield is exposed proximate the shell housing and the EMI braided shield positioned in alignment with the recessed portion. A constant force spring is positioned in the recessed portion of the shell housing. The constant force spring has an opening with an inner diameter which is less than the outer diameter of the recessed portion. The constant force spring is circumferentially wrapped about the EMI braided shield applying a force to the EMI braided shield and the recessed portion of the shell housing to mechanically and electrically secure the EMI braided shield to the recessed portion of the shell housing.

Other features and advantages of the present invention will be apparent from the following more detailed description of the illustrative embodiment, taken in conjunction with the accompanying drawings which illustrate, by way of example, the principles of the invention.

DETAILED DESCRIPTION OF THE INVENTION

Figure 1:
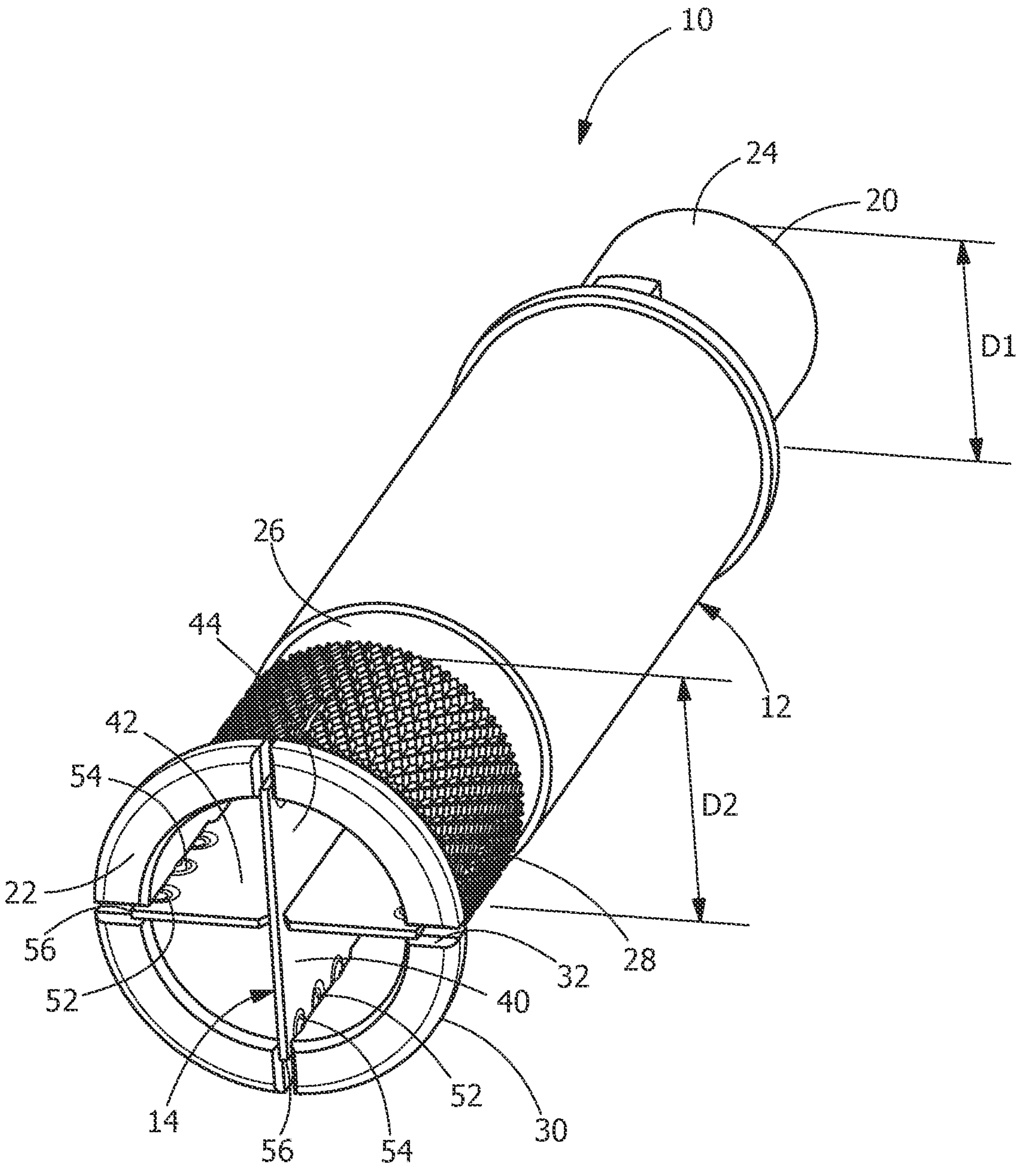
FIG. 1 is a perspective view of an illustrative shell housing of a high speed electrical connector with an illustrative crosstalk shield assembled thereto.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as “attached,” “affixed,” “connected,” “coupled,” “interconnected,” and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

As shown in FIG. 1, an electrical connector assembly 10 has a shell housing 12 and a crosstalk shield 14. The connector assembly 10 may be a plug connector assembly or a receptacle connector assembly.

The shell housing 12 has a mating end 20 and a conductor receiving end 22. In the illustrative embodiment shown, the shell housing 12 has a mating portion 24 proximate the mating end 20. The mating portion 24 has a smaller outside diameter D1 than the remainder of the shell housing 12. However, other configurations of the shell housing 12 may be used.

A recessed portion 26 is provided on the shell housing 12 proximate the conductor receiving end 22. The recessed portion 26 has multiple projections 28 which extend from the surface thereof. The recessed portion 26 has an outer diameter of D2, which is larger than the outside diameter D1 of the mating portion 24. A shoulder 30 extends circumferentially around the conductor receiving end 22 of the shell housing 12. The shoulder 30 is provided at one end of the recess portion 26. However, other configurations of the shell housing 12 may be used.

Crosstalk shield receiving recesses or slots 32 extend from the conductor receiving end 22 toward the mating end 20. The crosstalk shield receiving slots 32 extend through the shoulder 30 and into the recessed portion 26. In the embodiment shown, four crosstalk shield receiving slots 32 are provided to accommodate the configuration of the crosstalk shield 14. However, other numbers of crosstalk shield receiving slots 32 may be used to accommodate different configurations of the crosstalk shield 14.

The crosstalk shield 14 has a first shield member 40 and a second shield member 42. In the illustrative embodiment, the first shield member 40 and the second shield member 42 are made from nickel silver material, however, other materials, including corrosion resistant materials, may be used which exhibit the shielding characteristics required.

The first shield member 40 and the second shield member 42 have one or more first projections or embossments 52 and one or more second projections or embossments 54 which extend therefrom. The first embossments 52 extend from side edges 56 of the first shield member 40 and the second shield member 42 in a direction which is essentially perpendicular to the longitudinal axis of the first shield member 40 and the second shield member 42. The second embossments 54 extend from side edges 56 of the first portion 44 in a direction which is essentially perpendicular to the longitudinal axis of the first shield member 40 and the second shield member 42, and in a direction opposite from the first embossments 52.

Figure 4:
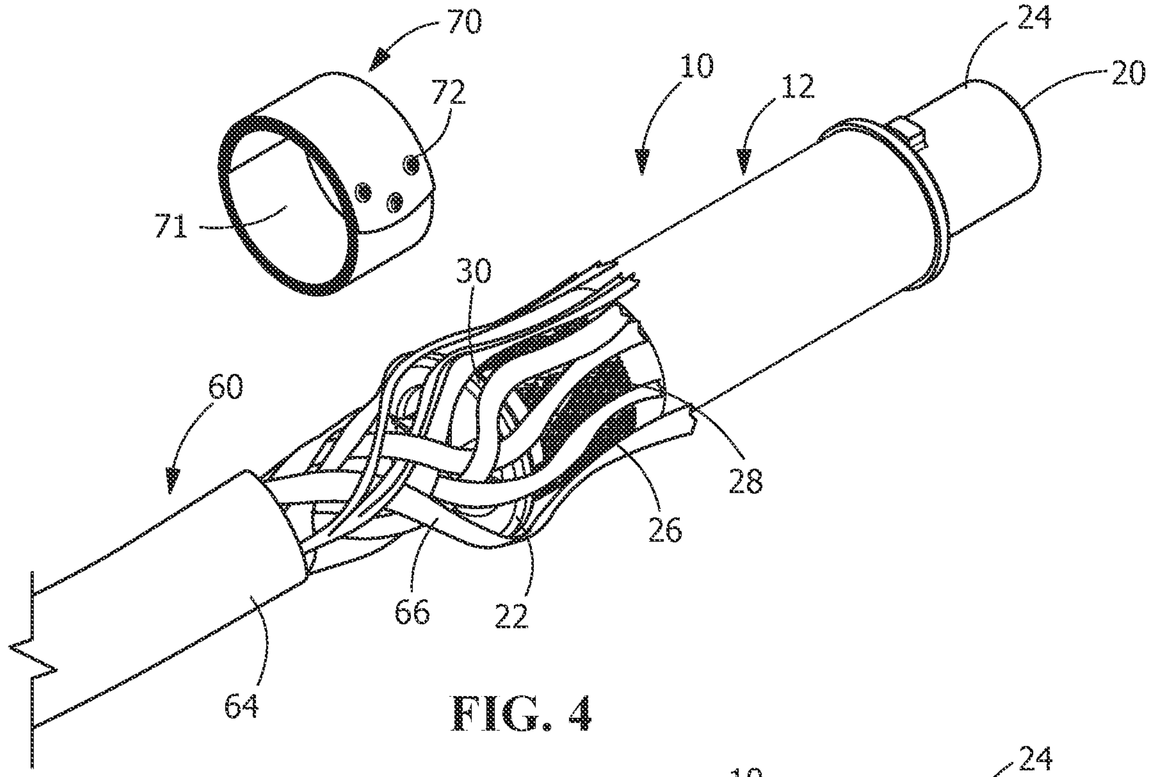
FIG. 4 is a perspective view of a high speed cable with differential pairs of signal conductors and an EMI braided shield, with the differential pairs housed in the shell housing and the EMI braided shield positioned outside of the shell housing.
Figure 5:
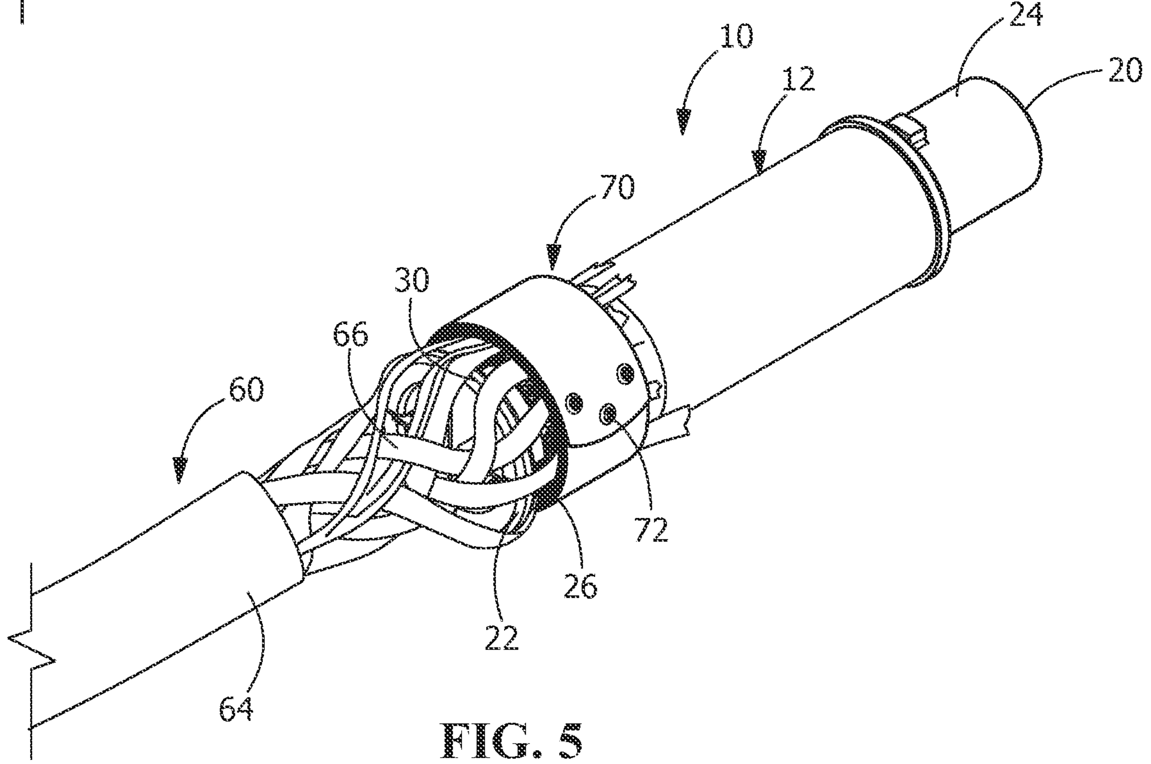
FIG. 5 is a perspective view of the high speed cable of FIG. 3 with the EMI braided shield terminated to the shell housing with the coil spring.

Referring to FIGS. 4 and 5, a high speed cable 60 with differential pairs of signal conductors (not shown) is terminated to the shield housing 12 of the connector assembly 10. The signal conductors have contacts (not shown) terminated thereto. The contacts are positioned in the contact receiving cavities 52 (FIG. 1) defined by the first shield member 40 and the second shield member 42 of the crosstalk shield 14. The high speed cable 60 includes an outer jacket 64 and an EMI braided shield 66 which surrounds the differential pairs of signal conductors.

Figure 2:
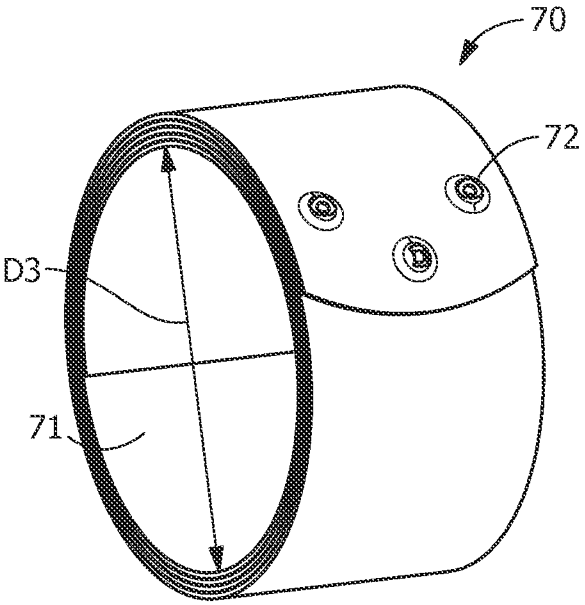
FIG. 2 is a perspective view of an illustrative embodiment of a coil spring of the present invention.
Figure 3:
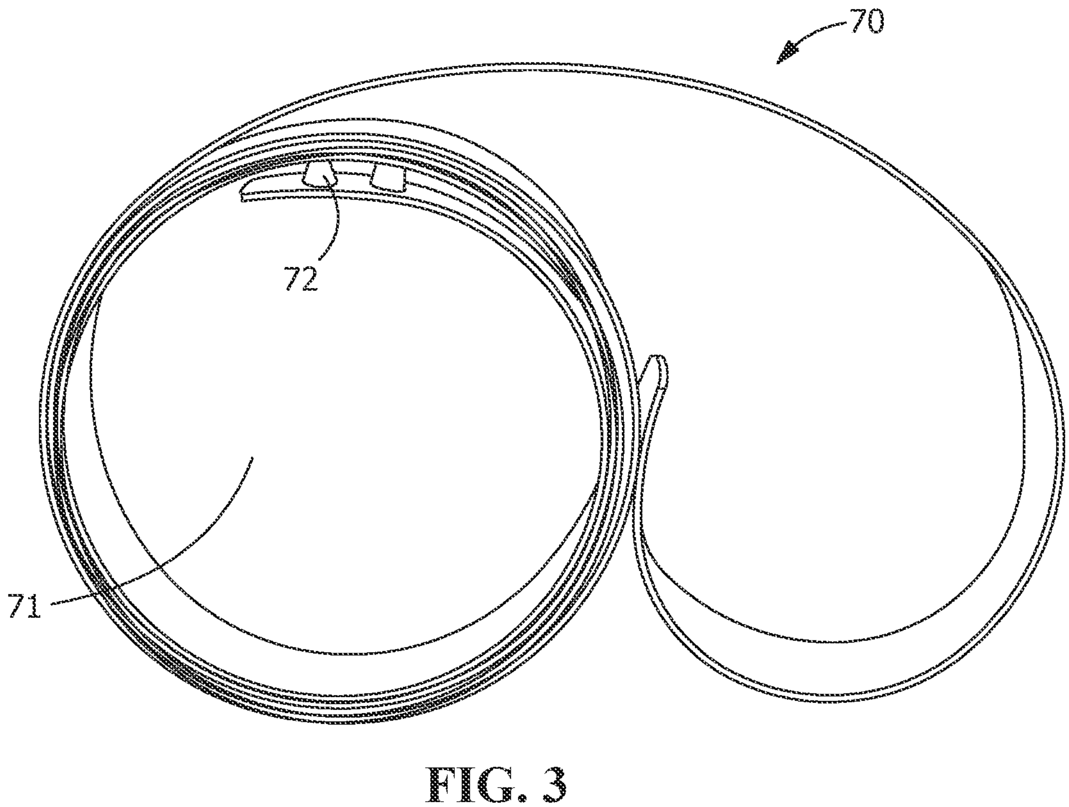
FIG. 3 is a side view of the coil spring of FIG. 2 partially unwound.

A coil or constant force spring 70 is circumferentially wrapped about the EMI braided shield 66, as will be more fully described. Referring to FIGS. 2 and 3, the coil spring 70 is a rolled ribbon of spring steel which forms a coil with multiple layers. The spring 70 is in a rolled up form when relaxed, as shown in FIG. 2. In this state, the spring 70 has a central opening or space 71 with an inner diameter of D3 when the spring is at rest and not applied to an object. The inner diameter D3 of the spring 70 is less than the outer diameter D2 of the recessed portion 26.

In the illustrative embodiment shown, the spring 70 has a plurality of projections 72 which extend from the outer end 74 of the spring 70. The projections 72 are provided to facilitate the removal of the spring 70 from the EMI braided shield 66 and the shell housing 12 as needed. However, the use of projections 72 is optional.

In use, the outer jacket 64 of the cable 60 is stripped to expose the differential pairs of signal conductors and the EMI braided shield 66. The shell housing 12 is positioned on the stripped end of the cable 60. As this occurs, the differential pairs of signal conductors are positioned inside of the shell housing 12 and the EMI braided shield 66 outside of the shell housing 12. As shown in FIG. 4, the EMI braided shield 66 is positioned over the conductor receiving end 22. In this position, the EMI braided shield 66 is positioned over the shoulder 30 and in line with the recessed portion 26.

With the shell housing 12 and the cable 60 properly positioned relative to each other, the constant force spring 70 is inserted over the EMI braided shield 66 in the area of the recessed portion 26, as shown in FIG. 5. As this occurs, the constant force spring 70 is circumferentially wrapped about the EMI braided shield 66 and about the radially underlying recessed portion 26 of the shell housing 12.

This causes a circumferential portion of the end of the EMI braided shield 66 radially inwardly toward the multiple projections 28 and the surface of the recessed portion 26. Upon such wrapping installation, the EMI braided shield 66 and the recessed portion 26 reside within the spring’s central opening or space 71 allowing the spring 70 securely clamps the EMI braided shield 66 in place. As the inner diameter D3 of the spring 70 is less than the outside diameter D2 of the recessed portion, the circumferentially wrapped spring 70 applies a clamping force to the EMI braided shield 66 and the recessed portion 26 to mechanically and electrically secure the EMI braided shield to the recessed portion of the shell housing. The multiple projections 28 engage the EMI braided shield 66 to provide an enhance interference engagement between the EMI braided shield 66 and the recessed portion 26 of the shell housing 12. In one illustrative embodiment, the clamping force results in a peak pull force of greater than 40 lbs. In another illustrative embodiment, the clamping force results in a peak pull force of between approximately 45 lbs. to approximately 50 lbs.

As the constant force spring 70 is inserted over the EMI braided shield 66 in the area of the recessed portion 26, the constant force spring 70 applies a force to the recessed portion 26 of the shell housing 12 causing respective walls of the walls of the one or more shield receiving recesses 32 to move toward each and applying force to the mounting projections or embossments 52, 54 which are positioned in the one or more shield receiving recesses 32. This provides an interference engagement to provide a secure mechanical and electrical connection between the shell housing and the crosstalk shield.

The constant force spring 70 is retained in the recessed portion 26 partially by the shoulder 30. The shoulder 30 extends circumferentially around the conductor receiving end 22 of the shell housing 12 and cooperates with the constant force spring 70 to prevent the removal of the EMI braided shield 66 when a force is applied in the longitudinal direction of the cable 60.

For at least the reasons recited above, the use of the constant force spring 70 to annularly clamp the EMI braided shield 66 upon the recessed portion 26 of the shell housing 12 advantageously resists extreme distally directed pulling forces which may otherwise undesirably detach the EMI braided shield 66 from the shell housing 12 and resists disengagement of the crosstalk shield 14 from the shell housing 12.

While the invention has been described with reference to a preferred embodiment, it will be understood by those skilled in the art that various changes may be made, and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. An assembly for terminating a high speed cable with an EMI braided shield, the assembly comprising:

a shell housing having a mating end and a conductor receiving end, a recessed portion provided proximate the conductor receiving end, the recessed portion having an outer diameter;

a crosstalk shield provided in the shell housing;

a constant force spring positioned in the recessed portion of the shell housing, the constant force spring having an opening with an inner diameter which is less than the outer diameter of the recessed portion;

a shoulder extending circumferentially around the conductor receiving end of the shell housing;

one or more shield receiving recesses extending through the shoulder and into the recessed portion;

wherein the constant force spring is circumferentially wrapped about the EMI braided shield to mechanically and electrically secure the EMI braided shield to the recessed portion of the shell housing.

2. The assembly as recited in claim 1, wherein the recessed portion has multiple projections which extend from an outer surface thereof, the multiple projections cooperate with the constant force spring which is circumferentially wrapped about the EMI braided shield to retain the EMI braided shield on the shell housing.

3. The assembly as recited in claim 1, wherein a mating portion is provided proximate the mating end of shell housing, the mating portion has a smaller outside diameter than the outer diameter of the recessed portion.

4. The assembly as recited in claim 1, wherein the constant force spring is a rolled ribbon of spring steel such that the constant force spring is in a rolled up form when relaxed.

5. The assembly as recited in claim 1, wherein the constant force spring results in a peak pull force of greater than 40 lbs.

6. A cable assembly comprising:

a shell housing having a mating end and a conductor receiving end, a recessed portion provided proximate the conductor receiving end, the recessed portion having an outer diameter;

a high speed cable with an EMI braided shield and differential pairs of signal conductors, the EMI braided shield exposed proximate the shell housing, the EMI braided shield positioned in alignment with the recessed portion;

a constant force spring positioned in the recessed portion of the shell housing, the constant force spring having an opening with an inner diameter which is less than the outer diameter of the recessed portion;

one or more shield receiving recesses extend from the conductor receiving end toward the mating end;

wherein the constant force spring is circumferentially wrapped about the EMI braided shield applying a force to the EMI braided shield and the recessed portion of the shell housing to mechanically and electrically secure the EMI braided shield to the recessed portion of the shell housing.

7. The cable assembly as recited in claim 6, wherein the constant force spring is a rolled ribbon of spring steel which forms a coil with multiple layers, the constant force spring is in a rolled up form when relaxed.

8. The cable assembly as recited in claim 7, wherein the constant force spring generates a peak pull force of greater than 40 lbs.

9. The cable assembly as recited in claim 8, wherein the recessed portion has multiple projections which extend from an outer surface thereof, the multiple projections cooperate with the constant force spring which is circumferentially wrapped about the EMI braided shield to retain the EMI braided shield on the shell housing.

10. The cable assembly as recited in claim 9, wherein a shoulder extends circumferentially around the conductor receiving end of the shell housing, the shoulder cooperates with the constant force spring to prevent the removal of the EMI braided shield when a force is applied in the longitudinal direction of the cable.

11. The cable assembly as recited in claim 10, wherein the one or more shield receiving recesses extend through the shoulder and into the recessed portion.

12. The cable assembly as recited in claim 11, wherein a crosstalk shield provided in the shell housing.

13. The cable assembly as recited in claim 12, wherein the crosstalk shield has a first shield member and a second shield member which define contact receiving cavities.

14. The cable assembly as recited in claim 13, wherein portions of the first shield member and the second shield member are positioned in the one or more shield receiving recesses.

15. The cable assembly as recited in claim 14, wherein the first shield member and the second shield member have one or more mounting projections which extend from side edges of the first shield member and the second shield member.

16. The cable assembly as recited in claim 15, wherein the mounting projections are embossments which cooperate with walls of the one or more shield receiving recesses to provide an interference engagement to provide a secure mechanical and electrical connection between the shell housing and the crosstalk shield.

17. The cable assembly as recited in claim 16, wherein the constant force spring applies a force to the recessed portion of the shell housing causing respective walls of the walls of the one or more shield receiving recesses to move toward each and applying force to the embossments.

* * * * *